_(12)_ United States Patent
Sharma et al.

(10) Patent No.: US 10,551,530 B2
(45) Date of Patent: Feb. 4, 2020

(54) PRISMATIC RETROREFLECTIVE SHEETING INCLUDING INFRARED ABSORBING MATERIAL

(71) Applicant: 3M INNOVATIVE PROPERTIES COMPANY, St. Paul, MN (US)

(72) Inventors: Neeraj Sharma, Woodbury, MN (US); Suman K. Patel, Woodbury, MN (US); Tadesse G. Nigatu, Cottage Grove, MN (US); Lee A. Pavelka, Cottage Grove, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 20 days.

(21) Appl. No.: 16/060,530

(22) PCT Filed: Dec. 6, 2016

(86) PCT No.: PCT/US2016/065193
§ 371 (c)(1),
(2) Date: Jun. 8, 2018

(87) PCT Pub. No.: WO2017/151202
PCT Pub. Date: Sep. 8, 2017

(65) Prior Publication Data
US 2018/0364403 A1 Dec. 20, 2018

Related U.S. Application Data

(60) Provisional application No. 62/264,763, filed on Dec. 8, 2015.

(51) Int. Cl.
*B32B 3/00* (2006.01)
*G02B 5/124* (2006.01)
(Continued)

(52) U.S. Cl.
CPC ............ *G02B 5/124* (2013.01); *B60R 13/105* (2013.01); *G02B 5/003* (2013.01)

(58) Field of Classification Search
CPC ........ G02B 5/003; G02B 5/124; B60R 13/105
See application file for complete search history.

(56) References Cited

U.S. PATENT DOCUMENTS 6,243,201 B1 6/2001 Fleming
6,677,030 B2 1/2004 Thakkar
(Continued)

FOREIGN PATENT DOCUMENTS

JP 2002-500969 1/2002
JP 2014-520003 8/2014
(Continued)

OTHER PUBLICATIONS

International Search Report for PCT International Application No. PCT/US2016/065193, dated Sep. 25, 2017, 4 pages.

*Primary Examiner* — Elizabeth E Mulvaney
(74) *Attorney, Agent, or Firm* — 3M IPC; Carlos M. Téllez

(57) ABSTRACT

A prismatic retroreflective sheeting includes a structured layer that includes a plurality of cube corner elements including a reduced tungsten oxide, a radiation-treated region, and a non-radiation-treated region. The prismatic retroreflective sheeting includes also includes an information-containing layer above the structured layer. The information-containing layer includes at least one indicia defining an edge. The radiation-treated region of the structured layer is adjacent and below at least part of the edge of the at least one indicia.

21 Claims, 6 Drawing Sheets

(51) Int. Cl.
*B60R 13/10* (2006.01)
*G02B 5/00* (2006.01)

(56) References Cited

U.S. PATENT DOCUMENTS

| | | | |
|---|---|---|---|
| 7,422,334 | B2 | 9/2008 | Smith |
| 9,415,539 | B2 | 8/2016 | Benson, Jr. |
| 9,523,919 | B2 | 12/2016 | Benson, Jr. |
| 2010/0031290 | A1 | 2/2010 | Hua |
| 2012/0200710 | A1 | 8/2012 | Nakajima |
| 2012/0281285 | A1 | 11/2012 | Orensteen |
| 2013/0034682 | A1 | 2/2013 | Free |
| 2013/0320276 | A1 | 12/2013 | Farrell |
| 2014/0116431 | A1 | 5/2014 | Palacharla |
| 2015/0191132 | A1* | 7/2015 | Muramoto ............. G09F 13/16 40/208 |
| 2015/0369975 | A1* | 12/2015 | Free ................... B42D 25/324 359/530 |

FOREIGN PATENT DOCUMENTS

| | | |
|---|---|---|
| KR | 10 2014 0033173 | 3/2014 |
| WO | 99/37470 | 7/1999 |
| WO | WO 2011-129832 | 10/2011 |
| WO | WO 2013-192275 | 12/2013 |

* cited by examiner

PRISMATIC RETROREFLECTIVE SHEETING INCLUDING INFRARED ABSORBING MATERIAL

CROSS REFERENCE TO RELATED APPLICATIONS

This application is a national stage filing under 35 U.S.C. 371 of PCT/US2016/065193, filed Dec. 6, 2016, which claims the benefit of Provisional Application No. 62/264, 763, filed Dec. 8, 2015, the disclosures of which are incorporated by reference in their entirety herein.

TECHNICAL FIELD

The disclosure relates to retroreflective sheeting that includes an infrared absorbing material.

BACKGROUND

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are cube corner sheeting and microsphere-based sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Cube corner retroreflective sheeting, sometimes referred to as "prismatic" sheeting, typically includes a thin transparent layer having a substantially planar first surface and a second structured surface comprising a plurality of geometric structures, some or all of which include three reflective faces configured as a cube corner element.

Due to the symmetrical geometry of beaded retroreflectors, microsphere based sheeting exhibits the same total light return regardless of orientation, i.e., when rotated about an axis normal to the surface of the sheeting. Thus, such microsphere-based sheeting has a relatively low sensitivity to the orientation at which the sheeting is placed on a surface. In general, however, such sheeting has a lower retroreflective efficiency than cube corner sheeting.

SUMMARY

In general, this disclosure describes techniques in which reduced tungsten oxide infrared absorptive material is incorporated within a prismatic retroreflective sheeting. As described herein, regions of the prismatic retroreflective sheeting may be treated with radiation, such as a laser energy, thereby achieving a prismatic retroreflective sheeting having enhanced readability under both visible and infrared (IR) light.

In some examples, a prismatic retroreflective sheeting includes a structured layer that includes a plurality of cube corner elements including a reduced tungsten oxide, a radiation-treated region, and a non-radiation-treated region. The prismatic retroreflective sheeting includes also includes an information-containing layer above the structured layer. The information-containing layer includes at least one indicia defining an edge. The radiation-treated region of the structured layer is adjacent and below at least part of the edge of the at least one indicia.

In some examples, a license plate includes a substrate and a prismatic retroreflective sheeting attached to the substrate. The prismatic retroreflective sheeting includes a structured layer including a plurality of cube corner elements that include a reduced tungsten oxide, a radiation-treated region, and a non-radiation-treated region. The prismatic retroreflective sheeting includes also includes an information-containing layer above the structured layer. The information-containing layer includes at least one indicia defining an edge. The radiation-treated region of the structured layer is adjacent and below at least part of the edge of the at least one indicia.

In some examples, a method includes forming a structured layer from a mixture comprising a polymer and a reduced tungsten oxide, wherein the structured layer includes a plurality of cube corner elements. The method also may include forming an information-containing layer above the structured layer. The information-containing layer may include at least one indicia defining an edge. The method further may include exposing a first region of the structured layer adjacent to at least part of the edge of the at least one indicia to coherent electromagnetic radiation to cause the first region to exhibit a first appearance under exposure to visible light. A second region of the structured layer that has not been exposed to the coherent electromagnetic radiation may exhibit a second, different appearance under exposure to visible light.

Examples described herein may offer certain advantages. For example, as described herein, the techniques may improve readability of alphanumeric character(s) under visible light. At the same time, unexposed reduced tungsten oxide in the prismatic retroreflective sheeting may reduce halation (the spreading of light beyond its desired boundaries in a developed photographic image) when exposed to infrared (IR) light, thus improving readability of the alphanumeric character(s) under IR light.

The details of one or more examples are set forth in the accompanying drawings and the description below. Other features, objects, and advantages will be apparent from the description and drawings, and from the claims.

DETAILED DESCRIPTION

Figure 1:
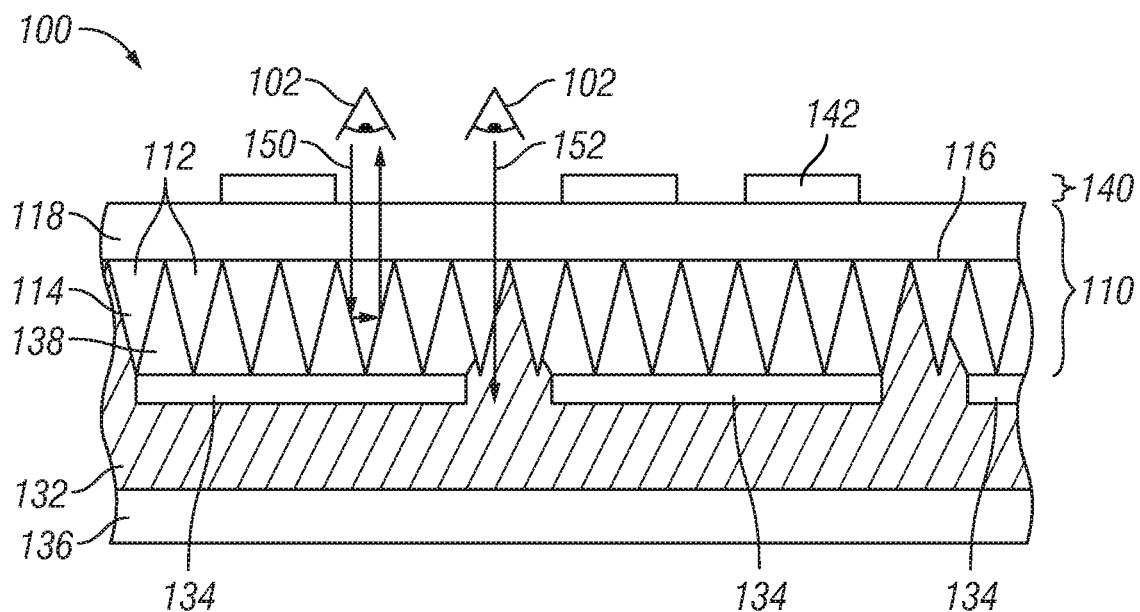
FIG. 1 is a conceptual and schematic cross-sectional diagram of an example prismatic retroreflective sheeting.

The disclosure describes prismatic retroreflective sheeting that includes a structured layer including cube corner elements that include a reduced tungsten oxide. The prismatic retroreflective sheeting includes a radiation-treated region exhibiting a first appearance under exposure to visible light and a non-radiation-treated region exhibiting a second, different appearance under exposure to visible light. The first and second appearances may be different, and may be caused by exposing the radiation-treated region to coherent electromagnetic radiation (e.g., coherent infrared (IR) light) of a predetermined wavelength and energy to change a property of the radiation-treated region, such as a property of the reduced tungsten oxide. For example, exposing the radiation-treated region to the electromagnetic radiation may cause the radiation-treated region to appear bleached (more white) when exposed to visible light compared to the non-radiation-treated region.

A reduced tungsten oxide is a mixed metal oxide that includes tungsten, and in which an average valence of tungsten is less than +6. Examples of reduced tungsten oxides include alkali tungsten oxides, such as cesium tungsten oxide ($Cs_{0.33}WO_3$, referred to as CsWO or CWO herein), sodium tungsten oxide, potassium tungsten oxide, and the like. In addition or as an alternative, the cube corner elements may include nanoparticles of doped metal oxides such as antimony tin oxide, indium tin oxide, mixed valent tungsten oxides, lanthanum hexaboride ($LaB_6$), IR absorbing dyes, IR absorbing pigments, and the like.

In some examples, the prismatic retroreflective sheeting also may include an information-containing layer above the structured layer. The information-containing layer includes at least one indicia defining an edge. The radiation-treated region may be positioned within the structured layer such that the radiation-treated region is adjacent and below at least part of the edge of the at least one indicia.

The structured layer may include reduced tungsten oxide to reduce brightness of the structured layer when exposed to IR light of the wavelength(s) at least partially absorbed by the IR absorptive material. For example, the inclusion of the reduced tungsten oxide may reduce halation (the spreading of light beyond its desired boundaries in a developed photographic image) when the prismatic retroreflective sheeting is exposed to IR light. In this way, the reduced tungsten oxide may improve visibility of at least one indicia when viewed under IR light. However, including the reduced tungsten oxide in the structured layer may cause the structured layer to exhibit a colored tint (e.g., a blue tint) under exposure to visible light. This may reduce contrast between the structured layer and a dark (e.g., black) indicia in visible light, and may reduce readability of the indicia.

Because the radiation-treated region appears more white when exposed to visible light, contrast between the first appearance of the radiation-treated region and the at least one indicia (when colored with a color other than white) under exposure to visible light is greater than contrast between the second, different appearance of the non-radiation-treated region and the at least one indicia under exposure to visible light.

In this way, the radiation-treated region may improve visibility of the at least one indicia under visible light compared to instances in which the at least one indicia is bordered by the non-radiation-treated region. At the same time, the unexposed CsWO in the non-radiation-treated region may reduce halation (the spreading of light beyond its desired boundaries in a developed photographic image) when exposed to IR light, thus improving visibility of the at least one indicia character under IR light.

For example, the prismatic retroreflective sheeting may be used in a license plate, which may be read using an automated license plate reader ("ALPR") system. The ALPR system may operate in the visible wavelength spectrum when ambient lighting is sufficient, and may operate in the IR wavelength spectrum when ambient lighting is insufficient. In this way, the non-radiation-treated region including unexposed CsWO may improve readability of the license plate by an ALPR system using IR light, while the radiation-treated region including exposed CsWO may improve readability of the license plate by an ALPR system using visible light.

FIG. 1 is a schematic side view of an example prismatic retroreflective sheeting 100 oriented to face a viewer 102. In the example of FIG. 1, prismatic retroreflective sheeting 100 includes a structured retroreflective layer 110 including multiple cube corner elements 112 that collectively form a structured surface 114 opposite a major surface 116. Cube corner elements 112 may be full cubes, truncated cubes, or preferred geometry (PG) cubes as described in, for example, U.S. Pat. No. 7,422,334, which is incorporated herein by reference in its entirety. In some examples, cube corner elements 112 may be canted with respect to each other such that retroreflectivity is improved over a wider range of incident light angles.

In example implementations, cube corner elements 112 include a polymeric material, including for example, a polycarbonate, an acrylate, a polyurethane, or the like. Some more specific examples of polymers for cube corner elements 104 include poly(carbonate), poly(methylmethacrylate), poly(ethyleneterephthalate), aliphatic polyurethanes, as well as ethylene copolymers and ionomers thereof. Some example radiation-curable polymers for use in cube corner elements 104 include cross linked acrylates, such as multi-functional acrylates or epoxies and acrylated urethanes blended with mono- and multifunctional monomers.

Structured retroreflective layer 110 shown in FIG. 1 includes an overlay layer 118 and cube corner elements 112 are disposed on the overlay layer 118. Alternatively, the structured retroreflective layer 110 may further comprise a land layer or land portion (402 shown in FIG. 4). The term "land layer" as used herein refers to a continuous layer of material coextensive with the cube corner elements and composed of the same material. In other examples, prismatic retroreflective sheeting 100 may omit overlay layer 118, which may result in more flexibility for prismatic retroreflective sheeting 100.

Prismatic retroreflective sheeting 100 also includes a conforming layer 132, which is located below structured retroreflective layer 110 from the perspective of viewer 102. In some examples, conforming layer 132 includes an adhesive. Exemplary adhesives that may be used in conforming layer 132 may include those described in PCT Patent Application No. PCT/US2010/031290, which is incorporated herein by reference in its entirety. In examples in which conforming layer 132 includes an adhesive, conforming layer 132 may assist in holding prismatic retroreflective sheeting 100 together.

In some embodiments, conforming layer 132 includes a pressure sensitive adhesive. The PSTC (Pressure Sensitive Tape Council) definition of a pressure sensitive adhesive is an adhesive that is permanently tacky at room temperature and which adheres to a variety of surfaces with light pressure (finger pressure) with no phase change (liquid to solid). While most adhesives (e.g., hot melt adhesives) require both heat and pressure to conform, pressure sensitive adhesives typically only require pressure to conform. Exemplary pressure sensitive adhesives include those described in U.S. Pat. No. 6,677,030, which is incorporated herein by reference in its entirety.

Prismatic retroreflective sheeting 100 also may include at least one barrier element 134 positioned between structured retroreflective layer 110 and conforming layer 132. At least one barrier element 134 form a physical "barrier" between cube corner elements 112 and conforming layer 132 and define low refractive index area 138. At least one barrier element 134 can directly contact or be spaced apart from or can push slightly into the tips of cube corner elements 112. At least one barrier element 134 may also prevent the conforming layer 132 from wetting out the cube corner elements on structured retroreflective layer 110.

In general, at least one barrier element 134 may include any material that prevents the material of conforming layer 132 from contacting cube corner elements 112 or flowing or creeping into low refractive index area 138. Example materials for use in at least one barrier element 134 include polymeric materials, including resins, vinyls, UV-curable polymers, or the like. The size and spacing of the at least one barrier element 134 may be varied. In some examples, at least one barrier element 134 may form a pattern in prismatic retroreflective sheeting 100. In some examples, the patterns may be continuous, discontinuous, monotonic, dotted, serpentine, any smoothly varying function, stripes, or the like.

Cube corner elements 112 and at least one barrier element 134 define low refractive index area 138 between cube corner elements 112 and at least one barrier element 134. The low refractive index area 138 facilitates total internal reflection such that light that is incident on cube corner elements 112 adjacent to low refractive index area 138 is retroreflected. As shown in FIG. 1, a light ray 150 incident on a cube corner element 112 that is adjacent to low refractive index area 138 is retroreflected back to viewer 102. For this reason, an area of retroreflective article 100 that includes low refractive index area 138 may be referred to as an optically active area. In contrast, an area of retroreflective article 100 that does not include low refractive index area 138 can be referred to as an optically inactive area because it does not substantially retroreflect incident light, as shown by light ray 152. As used herein, the term "optically inactive area" refers to an area that is at least 50% less optically active (e.g., retroreflective) than an optically active area. In some embodiments, the optically inactive area is at least 40% less optically active, or at least 30% less optically active, or at least 20% less optically active, or at least 10% less optically active, or at least at least 5% less optically active than an optically active area.

Low refractive index area 138 includes a material that has a refractive index that is less than about 1.30, less than about 1.25, less than about 1.2, less than about 1.15, less than about 1.10, or less than about 1.05. In some examples, low refractive index area 138 may include, for example, a gas (e.g., air, nitrogen, argon, and the like). In other examples, low refractive index area includes a solid or liquid substance that can flow into voids between or be pressed onto cube corner elements 112. Example materials include, for example, ultra-low index coatings (such as those described in PCT Patent Application No. PCT/US2010/031290), gels, or the like.

In some examples, prismatic retroreflective sheeting 100 additionally may include a substrate 136. In other examples, prismatic retroreflective sheeting 100 omit substrate 136. When present, substrate 136 may assist in holding prismatic retroreflective sheeting 100 together. For example, substrate 136 may include a polymer, such as a resin, a metal or alloy, or the like. In some examples, conforming layer 132 attaches structured retroreflective layer 110 and at least one barrier element 134 to substrate 136.

In some examples, prismatic retroreflective sheeting 100 additionally may include an information-containing layer 140 above overlay layer 118. Information-containing 140 may include at least one indicia 142. At least one indicia 142 may be readable from the vantage point of viewer 102. At least one indicia 142 may include a letter, a number, a symbol, or the like.

In some examples, at least one indicia 142 is embossed on the surface of overlay layer 118, e.g., using roll coating. At least one indicia 142 may be a different color than the remainder of prismatic retroreflective sheeting 100 when viewed from the vantage point of viewer 102. For example, at least one indicia 142 may possess a darker color (e.g., black) than the remainder of prismatic retroreflective sheeting 100 when viewed from the vantage point of viewer 102.

In some examples, prismatic retroreflective sheeting 100 may be a license plate, and at least one indicia 142 may represent the alphanumeric content of the license plate (e.g., license plate number, issuing jurisdiction, issue date or expiration date, or the like). In some examples, substrate 136 may include a metal or other substantially rigid material to provide support to the remainder of prismatic retroreflective sheeting 100.

In accordance with one or more examples of this disclosure, a first region of structured retroreflective layer 110, such as a first set of cube corner elements 112 may include an infrared (IR) absorptive material including a reduced tungsten oxide, such as cesium tungsten oxide (CsWO), calcium tungsten oxide, potassium tungsten oxide, or the like. The reduced tungsten oxide material may include, for example, microparticles or nanoparticles that absorb at least some IR light incident on the first region of structured retroreflective layer 110. By including the reduced tungsten oxide, the first region of structured retroreflective layer 110 may exhibit reduced brightness when exposed to IR light of the wavelength(s) at least partially absorbed by the IR absorptive material. In the context of sheeting that may be read by an automated document reader system, such as an ALPR, the inclusion of the reduced tungsten oxide may reduce halation (the spreading of light beyond its desired boundaries in a developed photographic image) when prismatic retroreflective sheeting 100 is exposed to IR light. In this way, the reduced tungsten oxide may improve visibility of at least one indicia 142 when viewed under IR light.

However, the reduced tungsten oxide may change the appearance of prismatic retroreflective sheeting 100 under exposure to visible light. For example, CsWO nanoparticles may have high transparency in most of the visible spectrum but a moderate absorption in the red part of the spectrum. Hence, CsWO may cause prismatic retroreflective sheeting 100 to have a blue tint under exposure to visible light (e.g., compared to an example in which the at least some of cube corner elements 112 do not include IR absorptive material). Other reduced tungsten oxides may produce a similar (same color or different color) tint in prismatic retroreflective sheeting 100. This may reduce the contrast between at least one indicia 142 and the surrounding background when viewed under visible light (e.g., compared to an example in which the at least some of cube corner elements 112 do not include IR absorptive material).

Further, a greater concentration of the reduced tungsten oxide in the at least some of cube corner elements 112 may result in a stronger tint. In some examples, the at least some of cube corner elements 112 may include greater than 0 weight percent (wt. %) and less than about 10 wt. % of the reduced tungsten oxide. In other examples, the at least some of cube corner elements 112 may include between about 0.125 wt. % and about 5 wt. % of the reduced tungsten oxide, or between about 0.125 wt. % and about 3 wt. % of the reduced tungsten oxide, or between about 0.125 wt. % and about 1 wt. % of the reduced tungsten oxide, or between about 2 wt. % and about 3 wt. % of the reduced tungsten oxide.

As described herein, by exposing a first region of structured retroreflective layer 110, such as a first set of cube corner elements 112, that includes the reduced tungsten oxide to coherent electromagnetic radiation having a predetermined wavelength and power, the appearance of the first region of structured retroreflective layer 110 under visible light can be changed. For example, the first region of structured retroreflective layer 110 (i.e., the radiation-treated region of structured retroreflective layer 110) may exhibit a lighter (e.g., whiter) appearance under exposure to visible light after being exposed to coherent electromagnetic radiation having a predetermined wavelength and power compared to a second first region of structured retroreflective layer 110 (i.e., a non-radiation-treated region of first region of retroreflective layer 110) that includes the reduced tungsten oxide and has not been exposed to the coherent electromagnetic radiation having a predetermined wavelength and power. In this way, contrast between the radiation-treated region comprising the first set of cube corner elements 112 and the at least one indicia 142 under exposure to visible light can be increased relative to the contrast between the non-radiation-treated comprising the second set of cube corner elements 112 and the at least one indicia 142.

The degree to which the first region of structured retroreflective layer 110 lightens may be based at least partially on an amount of the reduced tungsten oxide in the at least some of cube corner elements, the power of the coherent electromagnetic radiation, or the like. For example, cube corner elements 112 including a higher percentage of the reduced tungsten oxide may exhibit a greater blue tint under exposure to visible light, so the difference in lightening upon exposure to the coherent electromagnetic radiation having a predetermined wavelength and power may appear greater.

In some examples, the predetermined wavelength may include about 1064 nm. For example, a neodymium-yttrium vanadate (Nd:YVO$_4$) laser may be used as the source of laser light having a wavelength of about 1064 nm.

Figure 2:
FIG. 2 is a conceptual and schematic top view of an example prismatic retroreflective sheeting.

In some examples, the first region of structured retroreflective layer 110 may be positioned within structured layer 114 such that the first region of structured retroreflective layer 110 is adjacent and below at least part of an edge of the at least one indicia 142. For example, FIG. 2 is conceptual and schematic top view of an example prismatic retroreflective sheeting 200. As shown in FIG. 2, prismatic retroreflective sheeting 200 includes a plurality of indicia 202, a radiation-treated region 204, and a non-radiation-treated region 206. Radiation-treated region 204 exhibits a first appearance under exposure to visible light, and non-radiation-treated region 206 a second, different appearance under exposure to visible light.

For example, as shown in FIG. 2, radiation-treated region 204 may exhibit an appearance under visible light that is lighter (e.g., whiter) than the appearance of non-radiation-treated region 206. Non-radiation-treated region 206 may exhibit a tinted (e.g., blue tint) appearance under visible light. Because radiation-treated region 204 appears lighter than non-radiation-treated region 206, contrast between radiation-treated region 204 and plurality of indicia 202 under visible light is greater than contrast between non-radiation-treated region 206 and plurality of indicia 202. This may increase readability of plurality of indicia 202 under visible light, e.g., by an automated document reader, such as an ALPR.

As shown in FIG. 2, in some examples, radiation-treated region 204 is positioned within structured layer 114 (FIG. 1) so that radiation-treated region 204 substantially traces the respective edges of the plurality of indicia 202. The thickness of first set of cube corner elements 204 in the plane of prismatic retroreflective sheeting 200 may be selected such that radiation-treated region 204 enhances readability of plurality of indicia 202 under visible light.

Figure 3:
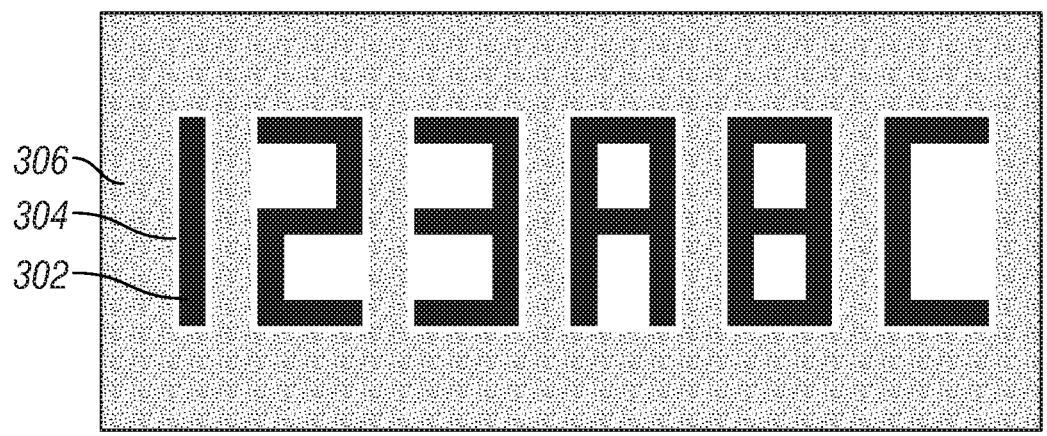
FIG. 3 is a conceptual and schematic top view of another example prismatic retroreflective sheeting.

In other examples, radiation-treated region 204 may be disposed in a different relationship to the plurality of indicia 202. FIG. 3 is conceptual and schematic top view of another example prismatic retroreflective sheeting 300. Similar to prismatic retroreflective sheeting 200, prismatic retroreflective sheeting 300 includes a plurality of indicia 302, a radiation-treated region 304, and a non-radiation-treated region 306. Unlike radiation-treated region 204 illustrated in FIG. 2, a radiation-treated region 304 defines respective curvilinear or polygonal shapes around respective ones of the plurality of indicia 302. In the particular example of FIG. 3, the curvilinear or polygonal shape includes a rectangle, although other curvilinear or polygonal shapes are contemplated.

In some examples, in addition to affecting the appearance of radiation-treated region 204 or 304 under visible light, exposure to the coherent electromagnetic radiation having a predetermined wavelength and energy may change an appearance of radiation-treated region 204 or 304 under IR light. For example, radiation-treated region 204 or 304 may absorb less IR light than non-radiation-treated region 206 or 306, and thus may also appear lighter than non-radiation-treated region 206 or 306 under exposure to IR light.

Additionally or alternatively, in some examples, radiation-treated region 204 or 304 may have a different retroreflectivity than non-radiation-treated region 206 or 306. For example, radiation-treated region 204 or 304 may have a lower retroreflectivity than non-radiation-treated region 206 or 306, where the retroreflectivity is defined as a percentage of incident light retroreflected by the respective set of cube corner elements. In some examples, radiation-treated region 204 or 304 may be substantially non retroreflective. Hence, radiation-treated region 204 or 304 may appear darker under retroreflective light than non-radiation-treated region 206 or 306.

Figure 4:
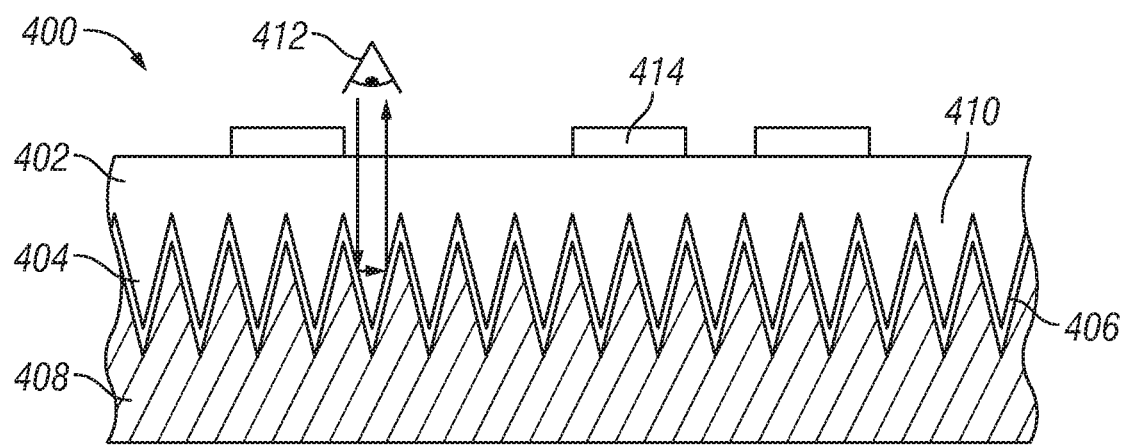
FIG. 4 is a conceptual and schematic cross-sectional diagram of another example prismatic retroreflective sheeting.

FIG. 4 is conceptual and schematic cross-sectional diagram of another example prismatic retroreflective sheeting 400. Unlike prismatic retroreflective sheeting 100 of FIG. 1, prismatic retroreflective sheeting 400 does not include at least one barrier element 134. Rather, prismatic retroreflective sheeting 400 includes a structured layer 410 including a plurality of cube corner elements 404, a land layer 402, a reflector layer 406 on the backside of cube corner elements 404, and a conforming layer 408 on the backside of cube corner elements 404.

Structured layer 410 including plurality of cube corner elements 404 may be similar to or substantially the same as structured retroreflective layer 110 and cube corner elements 112 illustrated in and described with respect to FIG. 1. Similarly, conforming layer 408 may be similar to or substantially the same as conforming layer 132 illustrated in and described with respect to FIG. 1.

Reflector layer 406 has good adhesion to cube corner elements 404. Reflector layer 406 can be formed, for example, using metal vapor deposition. Aluminum, silver, or the like may be used as the metal. Use of a suitable primer material such as a titanium metal sputter coated on cube corner elements 404 has been found to enhance the adhesion of the vapor deposition. Use of a metallic layer, may increase the entrance angularity of cube corner elements 404. Alternatively, reflector layer 406 may include a multilayer reflective coating disposed on the cube corner elements 404, such as is described, for example, in U.S. Pat. No. 6,243,201 to Fleming. The thickness of reflector layer 406 may be between about 300 Angstroms and about 800 Angstroms.

Prismatic retroreflective sheeting 400 also includes at least one indicia 414. At least one indicia 414 may be similar to or substantially the same as at least one indicia 142.

Similar to the example shown in FIG. 1, structured layer 410 (such as cube corner elements 404) may include an IR absorber, such as a reduced tungsten oxide. Further, structured layer 410 may include a radiation-treated region having a first appearance under exposure to visible light and a non-radiation-treated region having a second, different appearance under exposure to visible light. Additionally, the radiation-treated region may have a third appearance under exposure to IR light and the non-radiation-treated region may have a fourth, different appearance under exposure to IR light.

Figure 5:
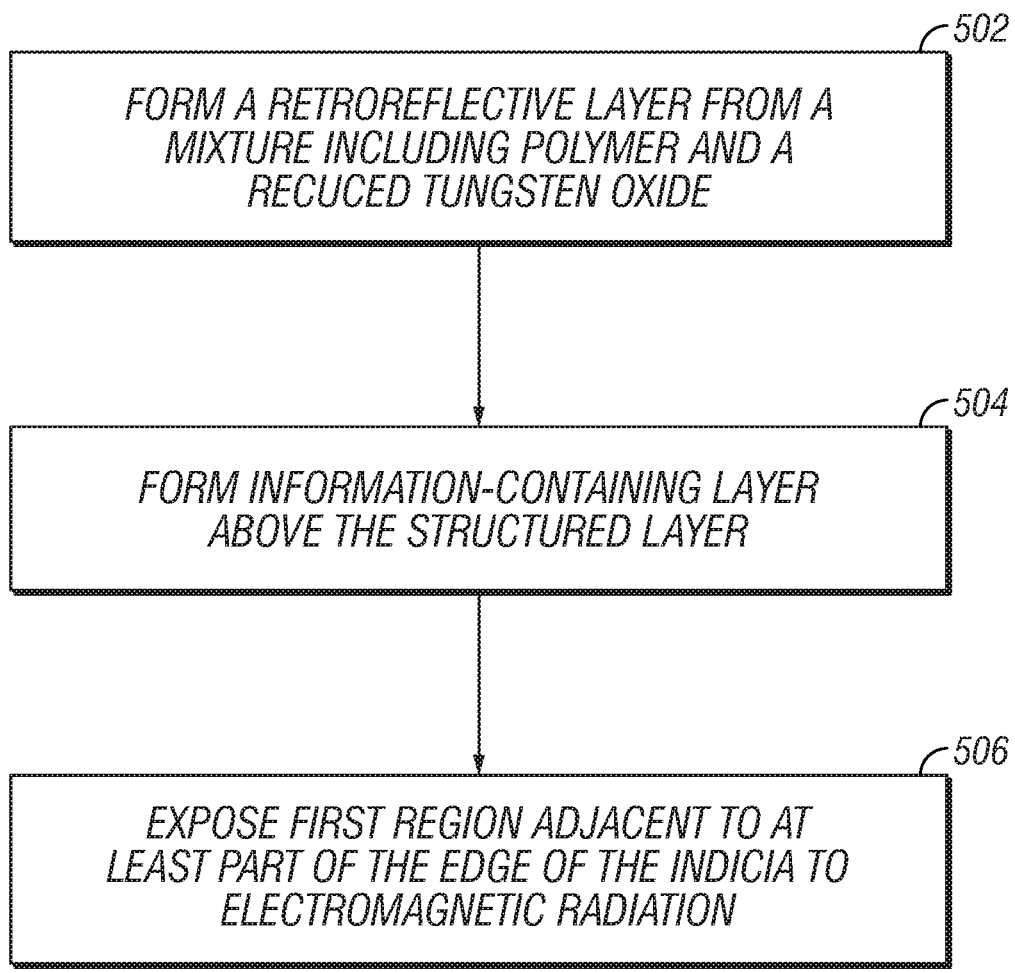
FIG. 5 is a flow diagram illustrating an example technique for forming a prismatic retroreflective sheeting.

The prismatic retroreflective sheeting may formed using one or more of a variety of techniques. For example, FIG. 5 is a flow diagram illustrating an example technique for forming a prismatic retroreflective sheeting. The technique of FIG. 5 will be described with respect to prismatic retroreflective sheeting 100 of FIG. 1 for purposes of illustration only. In other examples, prismatic retroreflective sheeting 100 may be formed using a different technique than FIG. 5, and the technique of FIG. 5 may be used to form other prismatic retroreflective sheeting, such as prismatic retroreflective sheeting 400 of FIG. 4.

The technique of FIG. 5 includes forming a structured retroreflective layer 110 from a mixture including a polymer and a reduced tungsten oxide (502). In some examples, structured retroreflective layer 110 includes a plurality of cube corner elements 112 comprising the polymer and the reduced tungsten oxide. In other examples, structured retroreflective layer 110 includes an overlay layer 118 that includes the polymer and the reduced tungsten oxide. In some examples, such as when the polymer includes a radiation-curable polymer, the technique may include casting the mixture comprising the radiation-curable polymer precursor and the reduced tungsten oxide, then curing the radiation-curable polymer to form structured retroreflective layer 110 including the plurality of cube corner elements 112 comprising the radiation-curable polymer and the reduced tungsten oxide.

The technique of FIG. 5 also includes forming information-containing layer 140 above the structured retroreflective layer 110 (504). Information-containing layer 140 includes at least one indicia 142 defining an edge. In some examples, prismatic retroreflective sheeting 100 may be a license plate, and at least one indicia 142 may represent the alphanumeric content of the license plate (e.g., license plate number, issuing jurisdiction, issue date or expiration date, or the like).

The technique of FIG. 5 further includes exposing a first region adjacent to at least part of the edge of the at least one indicia 142 to coherent electromagnetic radiation to cause the first region to exhibit a first appearance under exposure to visible light (506). A second region that has not been exposed to the coherent electromagnetic radiation may exhibit a second, different appearance under exposure to visible light. Due to the difference in appearance between the first, radiation-treated region and the second, non-radiation-treated region, contrast between the first appearance of the first region and the at least one indicia 142 under exposure to visible light is greater than contrast between the second, different appearance of the second region and the at least one indicia 142 under exposure to visible light. Additionally, in some examples, the first region may have a third appearance under exposure to IR light and the second region may have a fourth, different appearance under exposure to IR light.

In some examples, the technique of FIG. 5 additionally may include placing at least one barrier element 134 onto a conforming layer 132, which may include an adhesive, and then laminating the resulting construction to structured retroreflective layer 110. The retroreflective article may then, optionally, be adhesively bonded to a substrate (e.g., an aluminum substrate) to form, for example, a license plate or signage.

Although many of the described examples have been described with respect to license plates, the prismatic retroreflective sheeting may be used in other applications. For example, the prismatic retroreflective sheeting may be used in signage, including road signs; barricades; pavement markers; marking tape; vehicle reflectors; or the like. When used in road signs, pavement markers, vehicle reflectors, and the like, a camera reading the prismatic retroreflective sheeting may be mounted on a vehicle, such as an automobile. In this way, the prismatic retroreflective sheeting may be used in a stationary application read by a moving camera, or may be used in a moving application (e.g., a license plate on an automobile) read by a stationary camera.

EXAMPLES

Comparative Example 1 and Examples 1-5

Multiple samples of a prismatic retroreflective sheeting were prepared from the following components:

TABLE 1

|  | CsWO in final composition (Wt. %) | CsWO-HDDA (grams) | Cube resin (grams) | TPO actual |
|---|---|---|---|---|
| Comparative Example 1 (CE 1) | 0 | 0 | 800 | 18.63 |
| Example 1 | 0.125 | 1.245 | 204.65 | 0 |
| Example 2 | .025 | 2.49 | 204.65 | 0 |
| Example 3 | 0.5 | 4.99 | 204.65 | 0 |
| Example 4 | 1.0 | 9.98 | 204.65 | 0 |
| Example 5 | 3.0 | 29.94 | 204.65 | 0 |

CsWO-HDDA was obtained by solvent exchange of a CsWO nanoparticle dispersion (obtained from Sumitomo Metal and Mining Co., Ltd., Tokyo, Japan) in to 1,6-hexanediodiacrylate (HDDA) obtained from Sartomer Americas, Exton, Pa. Cube resin was a mixture including about 50 wt. % trimethylolpropane triacrylate (TMPTA), about 25 wt. % HDDA, about 25 wt. % bisphenol-A- diacrylate, about 0.5 wt. % 2,4,6-trimethylbenzoyl-diphenyl-phosphineoxide (TPO). Additional TPO was added to the cube resin in the Comparative Example 1 (CE 1), and about 0.5 wt. % 2-Hydroxy-2-methyl-1-phenyl-propan-1-one (available from Ciba Specialty Chemicals Inc., Basel, Switzerland, under the trade designation Ciba® DAROCUR® 1173). The CsWO-HDDA and the cube resin were mixed in the proportions set forth in Table 1 and microreplicated to make structured layers, as described in U.S. Patent Application Publication No. 2013/0034682, the entire disclosure of which is incorporated by reference herein.

The structured layer made as described above was laminated to an adhesive with barrier elements to form microreplicated prismatic sheetings, as described in U.S. Patent Application Publication No. 2013/0034682. The microreplicated prismatic sheetings were exposed to a Keyence Laser Marking instrument (MD-V9900 Series, available from Keyence Corporation, Osaka Japan). The Keyence Laser Marking instrument is a Neodymium-Yttrium Vanadate laser (Nd:YVO$_4$) equipped with software that allows varying of the scanning speed, power output, and the frequency of the instrument to adjust the energy delivered to the exposed material. The maximum output of the laser is approximately 8 watts. The distance between the sample and the focusing lens of the laser can also be adjusted for better focus.

Figure 6:
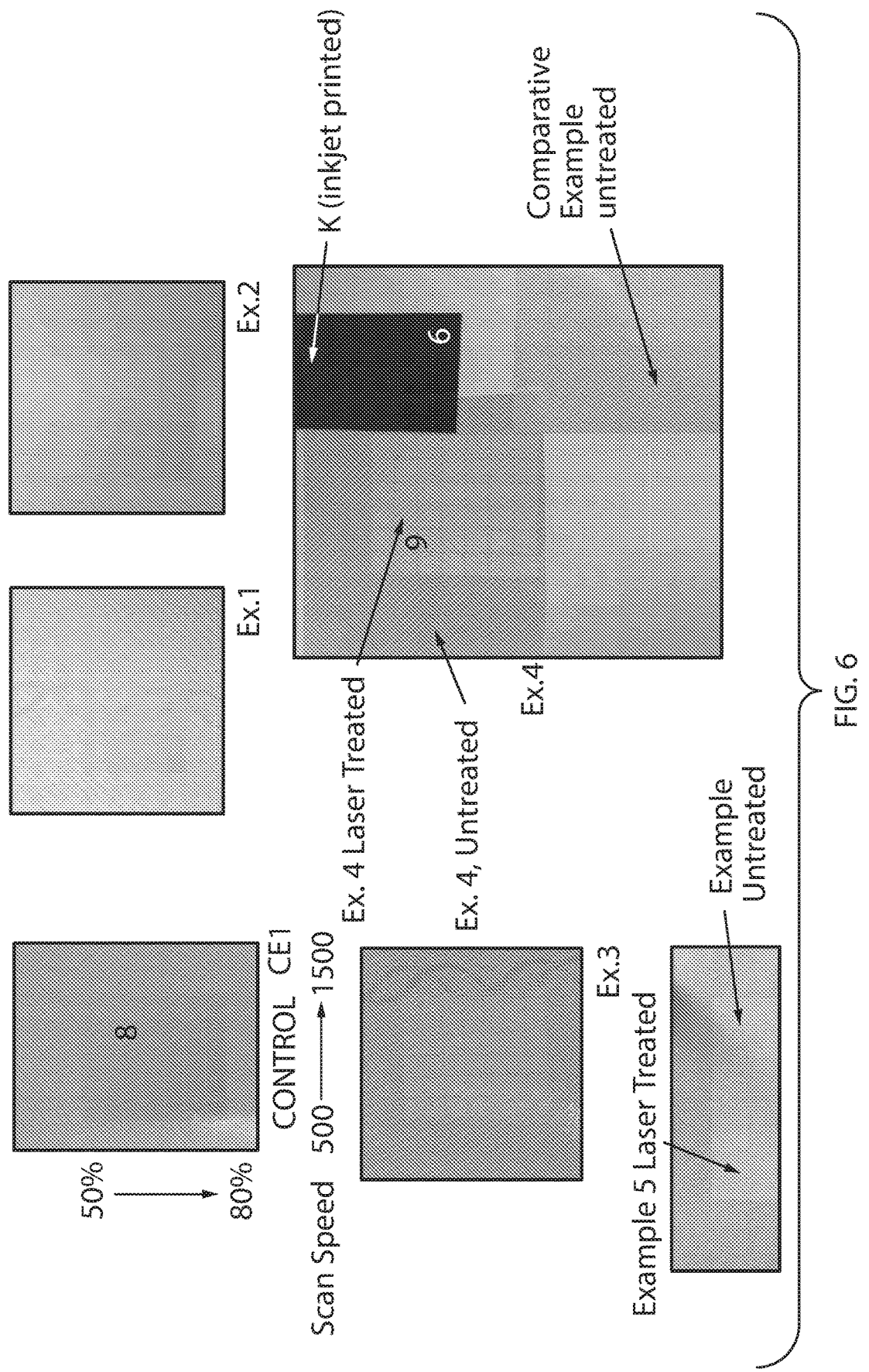
FIG. 6 is a set of photographs illustrating visible light images of microreplicated prismatic sheeting after exposure of portions of the microreplicated prismatic sheeting to laser energy.

Sheets made from the formulations shown in Table 1 were exposed to the laser at different power levels and 20 Hz frequency. The laser energy had a 1064 nm wavelength. In Comparative Example 1 and Examples 1-4, the power level was varied from 50% (approximately 4 watts) to 80% (approximately 6.4 watts) while the scanning speed was varied from 500 mm/sec to 1,500 mm/sec. As shown in FIG. 6, the top row of each sample was exposed at a power level of 50% and the bottom row exposed at a power level of 80%. The intermediate rows were exposed at intermediate power levels, progressing from lower energy (greater than 50%) in upper rows to greater power (less than 80%) in lower rows at 5% increments. Also shown in FIG. 6, the left-most column was exposed at a speed of 500 mm/sec and the right-most column was exposed at a speed of 1,500 mm/sec. The intermediate columns were exposed at intermediate speeds, progressing from lower speed (greater than 500 mm/sec in left columns to greater speed (less than 1,500 mm/sec) in right columns and at 200 mm/sec increments.

In Example 5, the power level was set to 40% and scan speeds were, respectively from left to right, 500 mm/sec, 1,000 mm/sec and 1,500 mm/sec.

Visible images were recorded using a SAMSUNG Galaxy SIII® cell phone camera (available from SAMSUNG Electronics, Seoul, South Korea). The images were obtained in office lighting conditions. No further image processing was carried out. FIG. 6 is a set of photographs illustrating visible light images of microreplicated prismatic sheeting made from the compositions of Comparative Example 1 and Examples 1-4, after exposure of portions of the microreplicated prismatic sheeting to the laser energy described above.

The laser treated regions for each of the sheets include an array of squares exposed at different of laser power levels ranging from 50% to 80% top to bottom and with different scan speeds between 500 mm/sec and 1500 mm/sec left to right.

The microreplicated prismatic sheeting formed from the composition of Comparative Example 1 (labeled as CE1 or control) shows a darkening effect (labeled 8) after the laser treatment, while samples containing CsWO (labeled Examples 1-5 with increasing CsWO content) show a lightening (or decolorization) effect in the laser treated regions. The lightening effect is more pronounced as the CsWO content increases, as the bluish tint of the untreated regions increased as the CsWO content increased.

From the visible images it is also clear that the contrast of the laser treated region (labeled 9) to ink-jet printed black (labeled 6) is higher than the contrast of untreated regions (labeled 5) to ink jet printed black (labeled 6). In fact, the contrast of the laser treated region (labeled 9) to ink jet printed black (labeled 6) is comparable to the contrast of untreated sheeting formed from Comparative Example 1 (labeled 7) to ink jet printed black (labeled 6).

Figure 7:
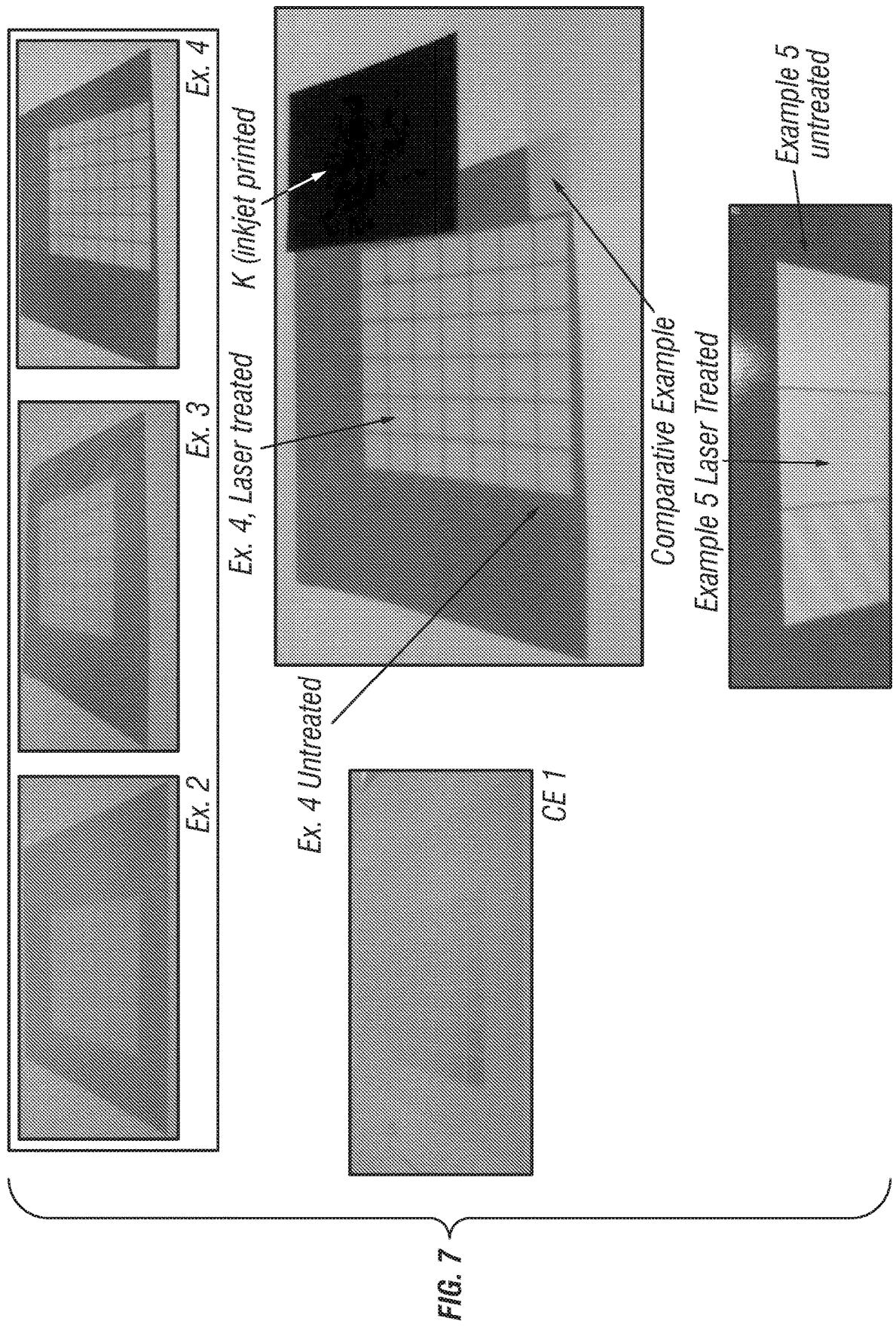
FIG. 7 is a set of photographs illustrating IR light images of microreplicated prismatic sheeting after exposure of portions of the microreplicated prismatic sheeting to laser energy.

Infrared images of the laser treated sheeting were recorded with a desktop computer camera with the Infrared filter removed. The images were recorded in office lighting conditions. No further image processing was carried out. FIG. 7 is a set of photographs illustrating IR light images of microreplicated prismatic sheeting made from the compositions of Comparative Example 1 and Examples 1-5, after exposure of portions of the microreplicated prismatic sheeting to the laser energy described above.

Infrared image of the microreplicated prismatic sheeting formed from the composition of Comparative Example 1 (containing no CsWO) appears colorless or white before laser treatment but shows a darkening effect post laser treatment (thereby indicating an increase in IR absorption). On the other hand, the IR images of the untreated portions of the microreplicated prismatic sheeting formed from the composition of Examples 1-5 appear dark (as a result of IR absorption by the CsWO) but appear colorless or white post-laser treatment when imaged with an IR camera (top row of images with 0.25%, 0.5% and 1.0% CsWO). While the laser treated control sample shows a darkening effect, the reverse is true for the CsWO containing samples which show a lightening (or decolorization or bleaching, possibly due to lack of IR absorption) effect. The bleaching effect on laser treatment is more pronounced with increasing CsWO content. In addition, the laser treated CsWO samples exhibit increased contrast with reference to inkjet printed black. For comparison purposes untreated sheeting made from Comparative Example 1 is also placed next to 1% CsWO sample.

Both visible and IR images clearly show that laser treatment of Examples 1-5, which include CsWO improves the contrast of the laser treated portions to that of inkjet printed black letters over the contrast of untreated CsWO samples to that of inkjet printed black.

Comparative Examples 2 and 3 and Examples 6-9

Reflectance and color measurements were made using a HunterLab UltraScan PRO spectrophotometer (available from Hunter Associates Laboratory, Inc., Reston, Va.), which meets CIE, ASTM and USP guidelines for accurate color measurement. The UltraScan PRO uses three Xenon flash lamps mounted in a reflective lamp housing as light source. The spectrophotometer is fitted with an integrating sphere accessory. This sphere is 152 mm (6 inches) in diameter and complies with ASTM methods E903, D1003, E308, et. al. as published in "ASTM Standards on Color and Appearance Measurements", Third Edition, ASTM, 1991. All samples were analyzed for percent reflectance with a white plate behind the sample. All samples were measured on the spray coated side with the adhesive backing facing the white plate. The spectra were measured in the range of 350 nm to 1050 nm with 5 nm optical resolution and reporting intervals. The spectra were recorded first with specular reflection included and then with specular reflection excluded. The color measurements were taken under D65/10 illumination.

Figure 8:
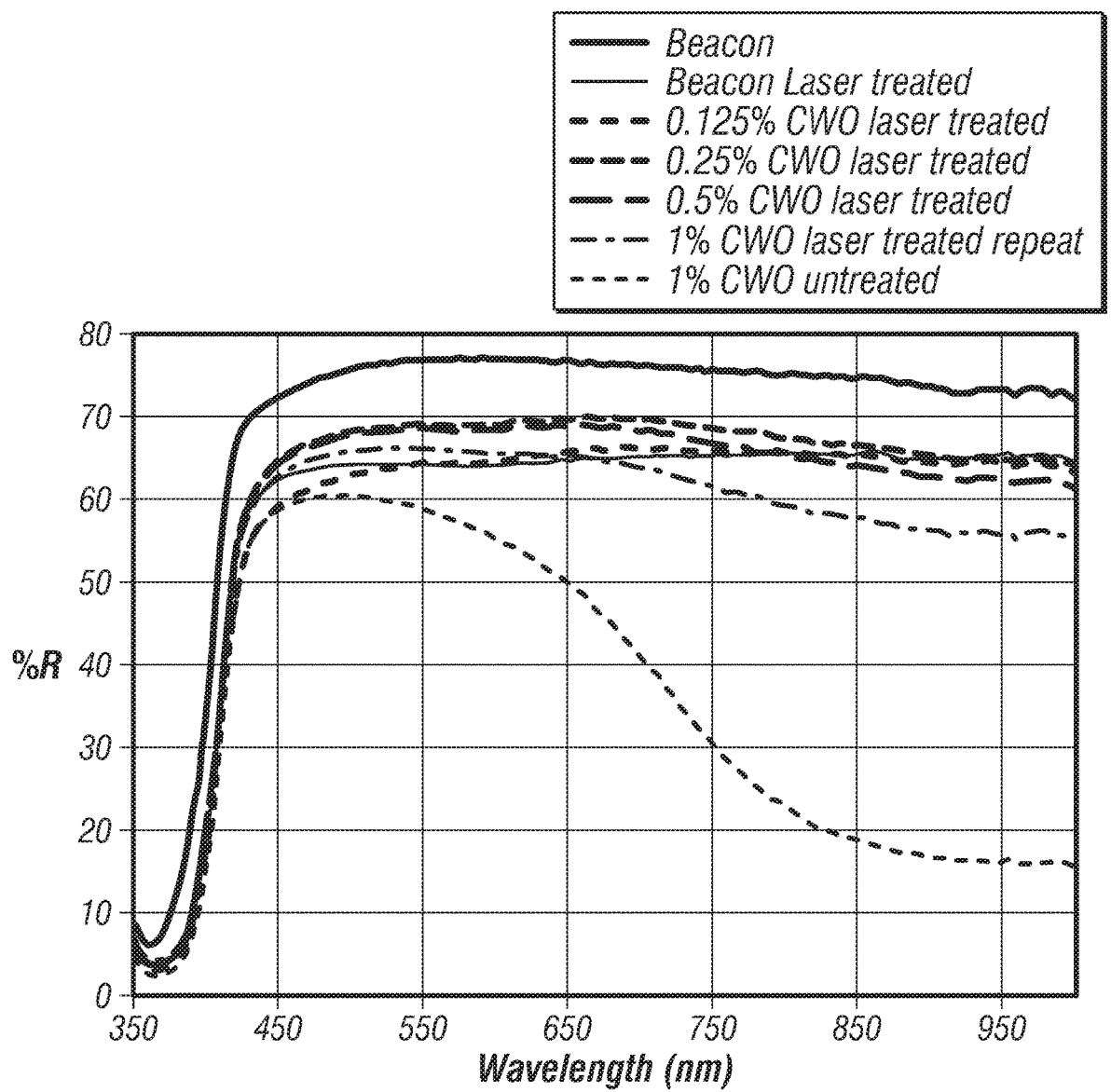
FIG. 8 is a diagram illustrating percent reflectance versus wavelength for prismatic retroreflective sheeting.

FIG. 8 is a diagram illustrating percent reflectance versus wavelength for prismatic retroreflective sheeting samples made from the compositions of Examples 1-5, along with Comparative Example 1. The sample made from the composition of Example 4 showed a strong IR absorption prior to laser treatment but shows a much decreased (or faint) IR absorption after laser treatment. Similarly, the sample made from the composition of Example 5 showed reduced IR absorption after laser treatment. The laser-treated samples made from the compositions of Examples 1-3 show faint IR absorption. Conversely, the samples made from the composition of Comparative Example 1 show increased IR absorption after laser treatment.

In addition, as shown in Table 2 below, color measurements also indicate an increase in L* from 80.71 for untreated sample made from the composition of Example 4 to L* of 84.8 for laser treated sample made from the composition of Example 4.

TABLE 2

| ID | L* | a* | b* |
|---|---|---|---|
| Comparative Example untreated | 90.11 | −1.31 | 3.88 |
| Comparative Example laser treated | 84.03 | −1.37 | 2.88 |
| Example 1 laser treated | 83.94 | −1.4 | 5.61 |
| Example 2 laser treated | 86.34 | −1.72 | 4.79 |
| Example 3 laser treated | 86.11 | −1.89 | 4.77 |
| Example 4 laser treated repeat | 84.87 | −2.24 | 3.99 |
| Example 4 untreated | 80.71 | −5.07 | 0.71 |
| Example 5 laser treated | 75.26 | −5.11 | 1.73 |
| Example 5 untreated | 72.03 | −8.65 | −5.3 |

Various examples have been described. These and other examples are within the scope of the following claims.

The invention claimed is:

1. A prismatic retroreflective sheeting comprising:
a structured layer comprising a plurality of cube corner elements comprising a reduced tungsten oxide, a radiation-treated region, and a non-radiation-treated region; and
an information-containing layer above the structured layer, wherein the information-containing layer comprises at least one indicia defining an edge, wherein the radiation-treated region of the structured layer is adjacent and below at least part of the edge of the indicia.

2. The prismatic retroreflective sheeting of claim 1, wherein the reduced tungsten oxide comprises an alkali tungsten oxide.

3. The prismatic retroreflective sheeting of claim 1, wherein the reduced tungsten oxide comprises $Cs_{0.33}WO_3$.

4. The prismatic retroreflective sheeting of claim 1, wherein the indicia comprises at least one of an alphanumeric character or a symbol.

5. The prismatic retroreflective sheeting of claim 1, wherein the structured layer comprises a polymer, wherein the reduced tungsten oxide is mixed with the polymer.

6. The prismatic retroreflective sheeting of claim 1, wherein the structured layer comprises:
the radiation-treated region, which comprises a first set of cube corner elements; and
the non-radiation-treated region, which comprises a second set of cube corner elements, wherein the first set of cube corner elements is positioned within the structured layer such that the first set of cube corner elements is adjacent and below at least part of the edge of the at least one indicia.

7. The prismatic retroreflective sheeting of claim 1, wherein:
the radiation-treated region exhibits a first appearance under exposure to visible light, and
the non-radiation treated region exhibits a second, different appearance under exposure to visible light.

8. The prismatic retroreflective sheeting of claim 7, wherein the first appearance is whiter than the second, different appearance.

9. The prismatic retroreflective sheeting of claim 7, wherein contrast between the first appearance of the radiation-treated region and the at least one indicia under exposure to visible light is greater than contrast between the second, different appearance of the non-radiation-treated region and the at least one indicia under exposure to visible light.

10. The prismatic retroreflective sheeting of claim 1, wherein the radiation-treated region exhibits a first appearance under exposure to infrared (IR) light, and wherein the non-radiation-treated region exhibits a second, different appearance under exposure to IR light.

11. The prismatic retroreflective sheeting of claim 10, wherein contrast between the first appearance of the radiation-treated region and the at least one indicia under exposure to IR light is greater than contrast between the second, different appearance of the non-radiation-treated region and the at least one indicia under exposure to IR light.

12. The prismatic retroreflective sheeting of claim 10, wherein the first appearance is lighter than the second, different appearance.

13. The prismatic retroreflective sheeting of claim 1, wherein the radiation-treated region is not retroreflective, and wherein the non-radiation-treated region is retroreflective.

14. The prismatic retroreflective sheeting of claim 1, wherein the radiation-treated region substantially traces the edge of the at least one indicia below the at least one indicia.

15. The prismatic retroreflective sheeting of claim 1, wherein the radiation-treated region defines a curvilinear or polygonal shape around the edge of the at least one indicia below the at least one indicia.

16. A license plate comprising:
a substrate; and
the prismatic retroreflective sheeting attached to the substrate, wherein the prismatic retroreflective sheeting comprises:
a structured layer comprising a plurality of cube corner elements comprising a reduced tungsten oxide, a radiation-treated region, and a non-radiation-treated region; and
an information-containing layer above the structured layer, wherein the information-containing layer comprises at least one indicia defining an edge, wherein the radiation-treated region of the structured layer is adjacent and below at least part of the edge of the indicia.

17. The license plate of claim 16, wherein the indicia comprises at least one of an alphanumeric character or a symbol.

18. The license plate of claim 16, wherein:
the radiation-treated region exhibits a first appearance under exposure to visible light, and
the non-radiation-treated region exhibits a second, different appearance under exposure to visible light.

19. The license plate of claim 18, wherein the first appearance is whiter than the second, different appearance.

20. The license plate of claim 16, wherein the radiation-treated region comprises a first appearance under exposure to infrared (IR) light, wherein the non-radiation-treated region comprises a second, different appearance under exposure to IR light, and wherein contrast between the first appearance of the radiation-treated region and the at least one indicia under exposure to IR light is greater than contrast between the second, different appearance of the non-radiation-treated region and the at least one indicia under exposure to IR light.

21. The license plate of claim 16, wherein the radiation-treated region is not retroreflective, and wherein the non-radiation-treated region is retroreflective.

\* \* \* \* \*